US 6,638,599 B2

(12) United States Patent
Masaki et al.

(10) Patent No.: US 6,638,599 B2
(45) Date of Patent: Oct. 28, 2003

(54) MAGNETIC RECORDING MEDIUM

(75) Inventors: Kouichi Masaki, Kanagawa (JP); Toshihiko Miura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 224 days.

(21) Appl. No.: 09/876,995

(22) Filed: Jun. 11, 2001

(65) Prior Publication Data

US 2002/0012814 A1 Jan. 31, 2002

(30) Foreign Application Priority Data

Jun. 9, 2000 (JP) .................................. P.2000-173725

(51) Int. Cl.$^7$ ............................................... G11B 5/706
(52) U.S. Cl. ................... 428/141; 428/403; 428/328; 428/336; 428/694 BA; 252/62.55
(58) Field of Search ........................ 428/403, 141, 428/694 BA, 328, 336; 252/62.55

(56) References Cited

U.S. PATENT DOCUMENTS

| | | | | |
|---|---|---|---|---|
| 5,188,898 A | * | 2/1993 | Tagawa et al. | 428/403 |
| 5,763,085 A | * | 6/1998 | Atarashi et al. | 428/403 |
| 6,024,890 A | * | 2/2000 | Poganiuch et al. | 252/62.58 |
| 6,136,428 A | * | 10/2000 | Truong et al. | 428/323 |

* cited by examiner

*Primary Examiner*—Stevan A. Resan
(74) *Attorney, Agent, or Firm*—Sughrue Mion, PLLC

(57) ABSTRACT

A ferromagnetic metal powder for magnetic recording containing iron as the main constituent and $MAl_2O_4$ (wherein M is a transition metal), wherein the coercive force (Hc) thereof is from 135 to 240 kA/m, the saturation magnetization ($\sigma$s) is from 100 to 150 A·m$^2$/kg, the average major axis length of the particles thereof is from 30 to 80 nm, the average acicular ratio of the particles is from 4.0 to 8.0, and the variation coefficient of the major axis lengths is from 3 to 25%. A magnetic recording medium having on a support a non-magnetic layer and at least a magnetic layer containing the above-described ferromagnetic metal powder, said medium has good short wavelength output and good S/N.

7 Claims, No Drawings

MAGNETIC RECORDING MEDIUM

FIELD OF THE INVENTION

The present invention relates to a magnetic recording medium such as a magnetic recording tape, etc., and particularly, the invention relates to a magnetic recording particulate medium comprising a support provided thereon a magnetic layer comprising a ferromagnetic powder dispersed in a binder wherein the magnetic layer is formed by coating a magnetic coating material containing a ferromagnetic powder and a binder on a support, and also relates to a magnetic recording medium excellent in the sensitivity and S/N in a short wavelength region. Furthermore, the invention relates to a magnetic recording particulate medium, which is particularly suitably used for the system of using an MR head utilizing a magnetic resistance effect for the playback (or reproduction).

BACKGROUND OF THE INVENTION

Because magnetic recording media have the excellent features that the medium can be repeatedly used, the electronization of signal is easy and the formation of a system by the combination with peripheral instruments is possible, signals can be easily corrected, etc., the magnetic recoding media have been widely utilized in various fields such as video tapes, audio tapes, computer tapes, etc.

Also, to cope with the requirements such as small-sizing of instrument, the improvement of the quality of recording and reproducing signals, long-time recording, the increase of the recording capacity, etc., in regard to the recording media, further improvements in the recording density, the reliability, and the durability has always been desired.

For example, to cope with the realization of a digital recording system of realizing the improvement of the audio quality and the image quality and the development of image recording system corresponding to high-vision TV, a magnetic recording medium, which can record and reproduce shorter wavelength signals than conventional systems and is excellent in the reliability and the durability even when the relative speed of the medium and head is increased, has been required. Also, the development of a digital recording medium of a large capacity for storing increasing data for the use of computers has been desired.

For high-density recording of a magnetic recording (particulate) medium, various methods have been investigated and proposed for improving the magnetic characteristics of the magnetic layer owing to improvements in magnetic substance, for example, by using an iron or iron-base alloy magnetic powder in place of a magnetic iron oxide powder, which has hitherto been used, or making magnetic powder more fine, or owing to improvements in the packing property and the orienting property of magnetic powder, for improving the dispersibility of ferromagnetic powder, and for increasing the surface property of the magnetic layer.

For example, methods of using a ferromagnetic metal powder or hexagonal ferrites as a ferromagnetic powder for increasing the magnetic characteristics are disclosed, for example, in JP-A-58-122623 (the term "JP-A" as used herein means "unexamined published Japanese patent application"), JP-A-61-74137, JP-B-62-49656 (the term "JP-B" as used herein means "examined Japanese patent publication"), JP-B-60-50323 and U.S. Pat. Nos. 4,629,653, 4,666,770 and 4,543,198.

Also, for increasing the dispersibility of a ferromagnetic powder, it is proposed to use various kinds of surface active agents (disclosed, for example, in JP-A-52-156606, JP-A-53-15803 and JP-A-53-1161114) and various kinds of reactive coupling agents (disclosed, for example, in JP-A-49-59608, JP-A-56-58135 and JP-B-62-28489).

Furthermore, for improving the surface property of the magnetic layer, a method of improving a surface-formation treatment after coating and drying is proposed as disclosed, for example, in JP-B-60-44725

For attaining a high recording density of a magnetic recording medium, it has strongly proceeded to shorten the wavelength of signal used. Because when the wavelength of the region of recording signal becomes the size comparable with the size of the magnetic powder used, a clear magnetizing transition state cannot be made, recording substantially becomes impossible. Accordingly, it is necessary to develop a magnetic powder having a particle size sufficiently smaller than the shortest wavelength used, and fining of the particle sizes of the magnetic powder has been intended for a long period of time.

In a metal powder for magnetic recording, by making the particle acicular to enhance shape anisotropy, the desired coercive force is obtained. It is well known for persons skilled in the art that it is necessary for high-density recording to make the particle sizes of a ferromagnetic metal powder fine and reduce the surface roughness of the magnetic recording medium obtained. However, in the metal powder for magnetic recording, with reducing the particle sizes, the acicular ratio is lowered and the desired coercive force cannot be obtained. Also, various investigations about the oxide layers formed on the surfaces of ferromagnetic metal powders for magnetic recording have been made by various methods, and the estimated values about the oxide layer thickness, the structure of oxides, and the magnetization of oxides are reported. Specifically, it is reported that the oxide composition is a spinel-type iron oxide ($FeO_x$:1.33≦x≦1.5), and the saturation magnetization of the iron oxide is about 40 $A·m^2$/kg.

Recently, for a data recording system for computers, a reproducing head (MR head) having a high sensitivity utilizing a magnetic resistance effect has been used, and the system noise is governed by the noise originated in a magnetic recording medium. Also, in the MR head, a reduction of the noise generation due to static electricity is one of problems.

That is, the development of a magnetic recording medium, which is in conformity with the characteristics of a magnetic resistance-type head (MR head) and further shows good electromagnetic characteristics, has been desired. Also, a magnetic recording medium, which is suitably used for a magnetic recording reproducing system combined with the MR magnetic head capable of recording at a high data transferring speed and at a high density, has been required.

SUMMARY OF THE INVENTION

The present invention has been made in view of the above-described problems of the related arts, and an object of the invention is to provide a ferromagnetic metal powder capable of producing a magnetic recording medium giving a short wavelength output and having a good S/N and a magnetic recording medium containing the ferromagnetic metal powder.

As the result of various investigations on the production method of a fine particulate ferromagnetic metal powder, a ferromagnetic metal powder containing $MAl_2O_4$ (wherein M is a transition metal) in the oxide of the surface layer thereof. Also, it has been found that because in the ferromagnetic metal powder, a non-magnetic sintering inhibitor and $MAl_2O_4$ existing on the surface of the particles thereof scarcely have magnetization, the interaction between the particles becomes small and when the ferromagnetic metal powder is highly packed in the magnetic layer of the magnetic recording medium, the coercive force is not lowered, and owing to the small interaction between the particles, the noise level of the magnetic recording medium is lowered. Also, it has been found that even by the ferromagnetic metal powder having small particle sizes, by which it has hitherto been difficult to obtain a high coercive force, the acicular ratio of the central metal portion can be increased and owing to the small interaction between the particles, the ferromagnetic metal powder having a high coercive force is obtained. Thus, the present invention has been accomplished.

That is, the present invention provides a ferromagnetic metal powder for magnetic recording, containing iron as the main constituent and containing $MAl_2O_4$ (wherein, M is a transition metal), wherein the coercive force (Hc) is from 135 to 240 kA/m, the saturation magnetization ($\sigma S$) is from 100 to 155 $A \cdot m^2/kg$, the average major axis length of the particles is from 30 to 80 nm, the average acicular ratio of the particles is from 4.0 to 8.0, and the variation coefficient of the major axis length of the particles is from 3 to 25%.

Also, the invention provides a magnetic recording medium comprising a support having provided thereon a non-magnetic layer mainly containing a non-magnetic powder and a binder and at least one magnetic layer provided on the non-magnetic layer, wherein the magnetic layer contains the above-described ferromagnetic metal powder.

DETAILED DESCRIPTION OF THE INVENTION

The preferred embodiments of the invention are as follows.

1) The ferromagnetic metal powder contains Co, and the content of Co is from 5 to 45 atom % based on 100 atom % of Fe.

2) The ferromagnetic metal powder contains $MFe_2O_{4,}$ and $MAl_2O_4/(MAl_2O_4+MFe_2O_4)$ is from 0.6 to 1.0 by mol ratio.

3) The ferromagnetic metal powder wherein in the element composition of the ferromagnetic powder, Al and the rare earth element components (including Y as the rare earth element) are originated from the Al compound and the rare earth compounds added to the raw materials for the ferromagnetic metal powder as a sintering inhibitor.

4) The ferromagnetic metal powder wherein the sum total of the water-soluble anions existing in the whole of the ferromagnetic metal powder is from 0 to 50 ppm by weight and the sum total of the water-soluble cations existing in the whole of the ferromagnetic metal powder is from 0 to 100 ppm by weight.

5) The magnetic recording medium wherein the coercive force of the magnetic layer containing the above-described ferromagnetic metal powder is from 135 to 240 kA/m, the saturation magnetic flux density x the magnetic layer thickness is from 10 to 100 $mT \cdot \mu m$, the magnetic layer thickness is from 0.01 to 0.3 $\mu m$, and the surface roughness of the above-described magnetic layer is from 1.0 to 3.0 nm in terms of center plane average surface roughness by a 3D-MIRAU method.

The ferromagnetic metal powder of the invention contains $MAl_2O_4$. There is no particular restriction on the existing form of $MAl_2O_4$ but it is preferred that the $MAl_2O_4$ has a spinel-type structure and exists in the surface layer of the ferromagnetic metal powder.

The existence of $MAl_2O_4$ can be confirmed by using the Rietveld method of an X-ray diffraction to the ferromagnetic metal powder obtained. That is, by assuming the scattering factor for M (using Fe) and Al to the lattice constant of the spinel-type oxide and the element position of the spinel-type structure, and fitting the element amount for satisfying the diffraction intensity obtained by the X-ray diffraction, it is confirmed that $MAl_2O_4$ is contained in the ferromagnetic metal powder as the component. When the scattering factors of the X-ray diffractions resemble, it cannot be specified whether or not the M is Fe or Co, or Fe-Co, or other metal such as other transition metal, etc., contained the ferromagnetic metal powder composition. In addition, in the surface layer of the ferromagnetic metal powder, other oxide than the spinel-type structure may exist but the content of such an oxide is preferably not more than 50% by weight of the whole oxides.

The lattice constant of the spinel-type oxide in the surface layer of the ferromagnetic metal powder of the invention is the index showing chemical species, and is preferably in the range of from 8.3 to 8.6 angstroms. In the case that $MAl_2O_4$ is the main constituent, the lattice constant becomes the range of from 8.5 to 8.6 angstroms.

When the oxide layer on the surfaces of the ferromagnetic metal powder of the invention is increased, in addition to $MAl_2O_4$, $FeO_x$ ($1.33 \leq x \leq 1.5$) is also detected. The existing ratio of $MAl_2O_4$ and $MFe_2O_4$ was from 0.1 to 1.0 showing by $MAl_2O_4/(MAl_2O_4+MFe_2O_4)$ (mol ratio). When $MAl_2O_4/(MAl_2O_4+MFe_2O_4)$ is preferably at least 0.2, more preferably at least 0.4, and particularly preferably at least 0.6, the noise is low and S/N is good. It is also preferred that the above-described ($MAl_2O_4+MFe_2O_4$) usually exists in the oxide layer in the amount of at least 40% by weight.

Also, the volume ratio per one particle of the metal portion obtained by removing the above-described oxide layer from the ferromagnetic metal powder of the invention is usually from 25 to 85% by volume, preferably from 30 to 80% by volume, and more preferably from 35 to 80% by volume.

The metal portion of the ferromagnetic metal powder means the portion made of metal crystallites by observing the lattice images of the ferromagnetic metal powder by a high-resolution transmission-type electron microscope and removing the oxide layers existing at the circumferences of the metal portions occupying the inside of the ferromagnetic powder from the whole of the ferromagnetic powder.

The metal portion is regarded as an independent particle and the size thereof is defined as the case of a powder. The average major diameter of the metal portions shows the average of the lengths of the major axes constituting the metal portions, the average minor axis of the metal portions shows the average of the lengths (the maximum length at the rectangular direction to the major axis) of the minor axes of the metal portions, and the average acicular ratio of the metal portions means the average value of the acicular ratios (major diameter/minor diameter). The variation coefficient of the acicular ratios means the % value obtained by dividing the standard deviation of the acicular ratios by the average acicular ratio. The variation coefficient of the major diameters means the % value obtained by dividing the standard deviation of the major diameters by the average major diameter. The variation coefficient of the minor diameters means the % value obtained by dividing the standard deviation of the minor diameters by the average minor diameter. In addition, the above-described size regulations are applied to the whole of ferromagnetic metal particles. The number of samples for obtaining the above-described statistic values is about 500. Furthermore, the above-described size regulations can be applied to other acicular powders.

As to the measurement method of the above-described samples, practically, there are following methods.

Ferromagnetic metal particles are photographed by a high-resolution transmission-type electron microscope, the outline of each ferromagnetic metal particle of the photographed high-resolution electron microphotograph is traced by an image-analyzing apparatus, the major axis length, the minor axis length (the maximum length at the rectangular direction to the major axis), and the acicular ratio (the major axis length/the minor axis length) of the ferromagnetic metal powder are determined. Also, the oxide layers of ferromagnetic metal particles are photographed by a high-resolution transmission-type electron microscope, the outline of the oxide layer of each ferromagnetic metal particle is traced by an image-analyzing apparatus, and the major diameter, the minor diameter, and the acicular ratio (the major diameter/the minor diameter) of the metal portion of the ferromagnetic metal powder are determined.

In the invention, the average major diameter of the ferromagnetic metal powder is preferably from 25 to 78 nm, and more preferably from 28 to 78 nm. The average acicular ratio of the metal portion of the ferromagnetic metal powder is preferably from 4 to 12.

There is no particular restriction on the element composition of the ferromagnetic metal powder of the invention, if the composition contains iron as the main constituent, and Fe or an Fe alloy with Co, Ni, etc., is preferred. The alloy of Co is particularly preferred because the alloy has large σs and can form the tight and thin oxide layer. In this case, the content of Co is preferably from 5 to 45 atom %, and more preferably from 10 to 40 atom % to 100 atom % of Fe. It is preferred that the raw materials are doped with a part of Co, then, the necessary amount of Co is adsorbed to the surface of the raw materials, and the alloy is formed by a reduction.

The ferromagnetic metal powder of the invention inevitably contains Al in addition to the above-described metal, and further may contain elements such as Si, S, Ti, V, Cr, Cu, Y, Mo, Rh, Pd, Ag, Sn, Sb, Te, Ba, Sr, W, Au, Pb, Bi, La, Ce, Pr, Nd, P, Mn, Zn, B, Ca, Mg, etc., including Al at the ratio of not more than 20% by weight. These elements have the effects of inhibiting sintering among the ferromagnetic metal particles, accelerating the reduction of the particles, and controlling the form of reduced ferromagnetic metal powder and the unevenness of the surfaces of the particles in addition to control the form of starting raw materials. In particular, it is preferred that in the element composition of the ferromagnetic metal powder, Al and the rare earth element components (including Y as the rare earth element) are originated in the Al compound and the rare earth compound used as the sintering inhibitors in the step of adding the sintering inhibitors to unreduced materials in the production of the ferromagnetic metal powder. As the rare earth element, Y and Nd are preferred.

It is better that the ferromagnetic metal powder of the invention contains Al in an amount of preferably from 4 to 20 atom %, and more preferably from 5 to 15 atom % to 100 atom % of Fe and it is also better that the ferromagnetic metal powder contains the rare earth elements at a sum total of from 5 to 20 atom %, and more preferably from 5 to 15 atom % to 100 atom % of Fe.

There is no particular restriction on the production method of the ferromagnetic metal powder of the invention if the above-described structure and characteristics are obtained, but practically, there are illustrated the following method.

The starting raw materials having the uniform particle sizes are subjected to a sintering inhibiting treatment with the above-described sintering inhibitor, impurities are carefully removed, the heat treatment condition at dehydration is investigated, the amount of a nitrogen gas stream at dehydration is increased, and steam generated are removed from the system without leaving in the system. After completing the dehydration reaction, the heat treatment temperature is increased to increase the crystalline property of hematite. Then, in the case of hydrogen reduction, the nucleus formation number of a metal (for example, Fe) from a metal oxide (for example, $Fe_3O_4$) is controlled to preferably from 1 to 3.

It is preferred to use mono-dispersed goethite or mono-dispersed hematite for the starting raw material. Also, it is preferred that the average major axis length of the starting raw material is from 40 to 140 nm, the average acicular ratio of from 3 to 12, and the variation coefficient of the major axis lengths is not larger than 25%. When the raw material having the average major axis length of shorter than 40 nm is used, Hc and σs cannot be established to the desired ranges. Also, when the raw material having the average major axis length of longer than 140 nm is used, a fine particular ferromagnetic metal powder cannot be obtained. Furthermore, when the average acicular ratio exceeds 12, in the heat-treatment steps for the dehydration and the reduction, it is difficult to retain the form thereof, and also when the average acicular ratio of less than 3, the coercive force of the ferromagnetic metal powder formed is small and thus the ferromagnetic metal powder cannot be used as the magnetic recording medium for high-density recording.

After applying the sintering inhibiting treatment to the starting material preferably with the sintering inhibitor as described above, it is necessary that the starting material is reduced with pure hydrogen gas at a temperature of from 350 to 650° C. for finally reducing to a metal, and it is preferred to apply an annealing treatment to the raw material in nitrogen gas at a temperature of from 350 to 750° C. before the reduction for forming $MAl_2O_4$. Also, in the case of reducing the same raw material to $Fe_3O_4$, FeO, etc., various kinds of reducing gases can be used in place of pure hydrogen gas. In the case of forming the nuclei of a metal from the metal oxide, it is preferred to remove water generated by the reduction from the system in a short time, or to control the amount of water generated by the reduction.

As well know, for the ferromagnetic metal powder, an oxide layer is formed on the surfaces of the particles by a slow oxidation treatment for chemically stabilizing the ferromagnetic metal powder. Also, the surfaces of the particles may contain a small amount of a hydroxide. It is preferred that the water content in the gas used at the beginning of the slow oxidation is severely controlled and it is preferred that the dew point is not higher than −40° C. Also, because when carbon dioxide gas is contained in the gas used at the slow oxidation, the carbon dioxide gas adsorbs the basic points of the surfaces of the ferromagnetic metal powder, the carbon dioxide gas may be contained in the gas.

For reducing the surface roughness of the magnetic recording medium, it is desirable that the average major axis length of the particles of the ferromagnetic metal powder is preferably from 30 to 80 nm, and more preferably from 35 to 80 nm, and the average acicular ratio is preferably from 4.0 to 8.0, and more preferably from 4.5 to 8.0. When the average major axis length of the particles of the ferromagnetic metal powder is shorter than 30 nm, not only the desired coercive force is not obtained but also in the case of preparing the magnetic coating material, it is difficult to disperse the material and also when a magnetic orientation is applied, the orientation effect is hard to occur. Also, by the influence of the oxide layer formed for the stabilization, it becomes difficult to insure a high saturation magnetization necessary for high-density recording. On the other hand, when the average major axis length of the particles of the ferromagnetic metal powder exceeds 80 nm, the desired super smooth surface is hard to be realized.

When the variation coefficient (%) of the major axis lengths [100×(the standard deviation of the major axis lengths/the average major axis length)] is sufficiently small as from 3 to 25% and the average acicular ratio is from 4.0 to 8.0, even when the ferromagnetic powder is fine particles, it is suitable because Hc is high and the Hc distribution is small.

The saturation magnetization of the ferromagnetic metal powder of the invention is from 100 to 155 A·m$^2$/kg, and preferably from 100 to 150 A·m$^2$/kg. Also, it is effective that immediately after the reduction, the ferromagnetic metal powder is treated with the compound or the coupling agents having various substituents described in JP-A-61-52327 and JP-A-7-94310 and then subjected to the slow oxidation because the saturation magnetization of the ferromagnetic metal powder is increased. The coercive force of the ferromagnetic metal powder is from 135 to 240 kA/m, and preferably from 145 to 225 kA/m.

In the ferromagnetic metal powder of the invention, it is preferred that the amount of water-soluble ions is low.

Because in the water-soluble ions of the ferromagnetic metal powder, an alkali metal and alkaline earth metal ions react with a fatty acid in the magnetic layer of the magnetic recording medium to form the fatty acid metal salts, when the magnetic recording medium is stored for a long time at a high temperature and a high humidity, the fatty acid metal salts formed sometimes cause the increase of the friction coefficient of the magnetic layer and the decrease in the reproducing output of the magnetic recording medium. Also, the fatty acid alkali salts react with the iron ions (which can be determined since they form iron complexes with benzohydroxamic acid) existing in the magnetic layer to form the fatty iron acid salts. Because the fatty acid iron salts have a remarkable sticking property, they sometime cause to particularly increase the friction coefficient of the magnetic layer. On the other hand, the water-soluble anions include a sulfate ion, a phosphate ion, a fluoride ion, a chloride ion, a nitrate ion, a nitrite ion, etc. When the amount of the anions is large, the anions react with the ferromagnetic metal powder, whereby the metallic iron is liable to be ionized, and the decomposition of the fatty acid ester in the magnetic layer and the decomposition of a urethane binder are accelerated. Also, since the anion prevents the adsorption of the polar group-containing binder onto the surfaces of the particles, the anion has a tendency of deteriorating the dispersing property. Furthermore, the anion has the tendency of corroding a metal head, metal guides, metal guide poles, etc.

As the result of investigating the preferred ranges about the kind and amount of the water-soluble ions for obtaining a magnetic recording medium of a single layer or multilayer structure excellent in the storage stability and the corrosion prevention of a metal head, it has been found that the sum total of the water-soluble anions existing in the whole ferromagnetic metal powder is preferably in the range of from 0 to 50 ppm by weight, and the sum total of the water-soluble cations is preferably in the range of from 0 to 100 ppm by weight. In the case of adsorbing the compound having an acidic functional group for improving the dispersing property, it is preferred that the sulfate ion, the phosphate ion, and the nitrate ion are reduced in the water-soluble anions. The sulfate ion is in the range of preferably from 0 to 10 ppm, and more preferably from 0 to 5 ppm, the phosphate ion is in the range of preferably from 0 to 8 ppm, and more preferably from 0 to 4 ppm, and the nitrate ion is in the range of preferably from 0 to 10 ppm, and more preferably from 0 to 5 ppm.

About the water-soluble cations, for restraining the formation of the fatty acid metal salts, it is effective to reduce the alkali metal ions and the alkaline earth metal ions. It is particularly preferred to reduce the alkali metal ions, and the content of the alkali metal ion is preferably from 0 to 30 ppm, and more preferably from 0 to 20 ppm.

The water-soluble ions in the invention are measured using an ion chromatography from an extract obtained by adding 50 ml of distilled water to 5 g of the ferromagnetic metal powder followed by stirring for one hour at 25° C. The sum total of the water-soluble cations means the sum total of ($Na^+$, $NH_4^+$, $K^+$, $Mg^{2+}$, and $Ca^{2+}$), and the sum total of the water-soluble anions is the sum total of ($F^-$, $Cl^-$, $NO_2^-$, $Br^-$, $NO_3^-$, $PO_4^{3-}$, and $SO_4^{2-}$) It sometimes happens that the charges of the anions are not balanced with the charges of the cations due to differences of pHs (dissociated state of water) of the solutions.

In the magnetic layer of the magnetic recording medium of the invention, at least the ferromagnetic metal powder of the invention is used but other ferromagnetic metal powder than the above-described ferromagnetic metal powder can be used together.

Also, the ferromagnetic metal powder of the invention can be previously treated with a dispersing agent, a lubricant, a surface active agent, an antistatic agent, etc., described below before dispersing. Practically, they are described, for example, in JP-B-44-14090, JP-B-45-18372, JP-B-47-22062, JP-B-47-22513, JP-B-46-28466, JP-A-46-38755, JP-B-47-4286, JP-B-47-12422, JP-B-47-17284, JP-B-47-18509, JP-B-47-18573, JP-B-39-10307/1964, JP-B-48-39639, U.S. Pat. Nos. 3,026,215, 3,031,341, 3,100, 194, 3,242,005, 3,389,014.

It is desirable that the water content of the ferromagnetic metal powder of the invention is from 0.1 to 2% by weight. Also, according to the kind of the binder described later, it is desirable to optimize the water content of the ferromagnetic metal powder, and usually, it is preferred that the water content is from about 0.5 to 1.5% by weight.

It is desirable that the tap density of the ferromagnetic metal powder of the invention is from 0.2 to 0.8 g/cm$^3$. When the tap density is higher than 0.8 g/cm$^3$, because when the magnetic powder is slowly oxidized, the magnetic powder is not uniformly slow-oxidized, it is difficult to safely handle the ferromagnetic metal powder and also the magnetization of the ferromagnetic metal powder obtained is quickly reduced with the passage of time. On the other hand, when the tap density is lower than 0.2 g/cm$^3$, dispersion of the ferromagnetic metal powder is liable to become insufficient.

As the binder resin of the magnetic layer in the magnetic recording medium of the invention, thermoplastic resins, thermosetting resins, reactive resins, and the mixtures thereof, which have hitherto been known, can be used. As the thermoplastic resin, the glass transition temperature is from −100 to 150° C., the number average molecular weight is from 1000 to 200,000, and preferably from 10,000 to 100,000, and the polymerization degree is from about 50 to 1000.

Such a binder resin includes the polymers or copolymers containing, e.g., vinyl chloride, vinyl acetate, vinyl alcohol, maleic acid, acrylic acid, an acrylic acid ester, vinylidene chloride, acrylonitrile, methacrylic acid, a methacrylic acid ester, styrene, butadiene, ethylene, vinylbutyral, vinylacetal and vinyl ether as the constitution unit(s), a polyurethane resin, and various kinds of rubber-base resins.

Also, the thermosetting resin or reactive resin includes, e.g., a phenol resin, an epoxy resin, a polyurethane thermosetting-type resin, a urea resin, a melamine resin, an alkyd resin, an acrylic reactive resin, a formaldehyde resin, a silicone resin, an epoxy-polyamide resin, a mixture of a polyester resin and an isocyanate prepolymer, a mixture of polyester polyol and polyisocyanate, a mixture of polyurethane and polyisocyanate.

For obtaining a more excellent dispersing effect of the ferromagnetic powder and durability of the magnetic layer, it is preferred to use binder resin having introduced into the above-described resins at least one polar group selected from COOM, $SO_3M$, $OSO_3M$, $P=O(OM)_2$, $O-P=O(OM)_2$ (wherein M represents a hydrogen atom or an alkali metal base), OH, $NR_2$, $N^{+R}_3$ (wherein R represents a hydrocarbon group), an epoxy group, SH and CN by a copolymerization or an addition reaction. The content of such a polar group is from $10^{-1}$ to $10^{-8}$ mol/g, and preferably from $10^{-2}$ to $10^{-6}$ mol/g.

The binder resin used for the magnetic recording medium of the invention is used in the range of from 5 to 50% by weight, and preferably from 10 to 30% by weight to the weight of the ferromagnetic powder. In the case of using a vinyl chloride resin, the amount thereof is from 5 to 100% by weight, in the case of using a polyurethane resin, the amount thereof is from 2 to 50% by weight, and polyisocyanate is preferably used by combining with the resin(s) in the range of from 2 to 100% by weight.

Also, the packing degree of the ferromagnetic metal powder of the magnetic layer can be calculated uing σs and the maximum magnetic flux density (Bm) of the ferromagnetic metal powder used according to a formula of Bm/4πδs. In the invention, the value is desirably at least 1.8 g/cm$^3$, more desirably at least 2.0 g/cm$^3$, and most desirably at least 2.2 g/cm$^3$.

In the invention, when polyurethane is used as the binder resin, it is preferred that the glass transition temperature thereof is from −50 to 100° C., the breaking extension is from 100 to 2000%, the breaking stress is 0.05 to 10 kg/cm$^2$ (4.9 to 980 kPa), and the yield point is from 0.05 to 10 kg/cm$^2$ (4.9 to 980 kPa).

The polyisocyanate used in the invention includes isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocynate, triphenylmethane triisocyanate, etc.; the products of the isocyanates and a polyalcohol, and polyisocyanates formed by the condensation of these isocyanates.

As the trade names of these commercially available isocyanates, there are Coronate L, Coronate HL, Coronate 2030, Coronate 2031, Millionate MR, and Millionate MTL (manufactured by Nippon Polyurethane Industry Co., Ltd.): Takenate D-102, Takenate D-110N, Takenate D-200, and Takenate 202 (manufactured by Takeda Chemical Industries, Ltd.); Desmodur L, Desmodur IL, Desmodur N and Desmodur HL (manufactured by Sumitomo Bayer Urethane Co., Ltd), etc., and they can be used singly or as a combination of two or more thereof by utilizing the difference in curing reactivity.

The magnetic layer of the magnetic recording medium of the invention can usually contain materials having various functions, for example, a lubricant, an abrasive, a dispersing agent, an antistatic agent, a plasticizer, and an antifungal agent according to the purposes.

A lubricant used for the magnetic layer in the invention includes silicone oils such as a dialkylpolysiloxane (alkyl: 1 to 5 carbon atoms), a dialkoxypolysiloxane (alkoxy: 1 to 4 carbon atoms), a monoalkylmonoalkoxypolysiloxane (alkyl: 1 to 5 carbon atoms, alkoxy: 1 to 4 carbon atoms), phenylpolysiloxane, a fluoroalkylpolysiloxane (alkyl: 1 to 5 carbon atoms), etc.; electric conductive fine powders such as graphite, etc.; inorganic powders such as the powders of molybdenum disulfide, tungsten disulfide, etc.; plastic fine powders such as the fine powders of polyethylene, polypropylene, a polyethylene-vinyl chloride copolymer, polytetrafluoroethylene, etc.; α-olefin polymers; saturated fatty acids (having 10 to 22 carbon atoms), which are solids at normal temperature; unsaturated aliphatic hydrocarbons, which are liquids at normal temperature (compounds wherein n-olefin double bond is bonded to the carbon atom at the terminal, about 20 carbon atoms); fatty acid esters made of mono-basic fatty acids having from 12 to 20 carbon atoms and monohydric alcohols having from 3 to 12 carbon atoms; fluorocarbons, etc.

In the above-described lubricants, the saturated fatty acid and the fatty acid ester are preferred, and it is more preferred to use these compounds together. The alcohols, which are the raw materials of the fatty acid esters, include monoalcohols, e.g., ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether or sec-butyl alcohol; and polyhydric alcohols, e.g., ethylene glycol, diethylene glycol, neopentyl glycol, glycerol or sorbitan derivatives.

The fatty acids include aliphatic carboxylic acids, e.g., acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid or palmitoleic acid, or the mixtures thereof.

Practical examples of the fatty acid ester include various ester compounds, e.g., butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, dipropylene glycol monobutyl ether acylated with stearic acid, diethylene glycol dipalmitate, hexamethylene diol which is acylated with myristic acid to form a diol or oleate of glycerol.

For restraining the hydrolysis of a fatty acid ester, which frequently occurs in the case of using a magnetic recording medium under a high humidity, it is practiced to select the isomer structure such as branch/straight chain and cis/trans and the branched position of the fatty acid and the alcohol of the raw materials.

The lubricant is usually added in the range of from 0.2 to 20 parts by weight to 100 parts by weight of the binder.

As the lubricant, the following compounds may also be used. Specific examples thereof include silicon oils, graphite, molybdenum disulfide, boron nitride, fluorinated graphite, fluorine alcohols, polyolefins, polyglycols, alkylphosphoric acid esters and tungsten disulfide.

The abrasives used for the magnetic layer in the invention include, e.g., α-and γ-aluminas, fused alumina, corundum, artificial corundum, silicon carbide, chromium oxide ($Cr_2O_3$), diamond, artificial diamond, garnet, emery (main constituents: corundum and magnetite) and α-$Fe_2O_3$. The Mohs' hardness of the abrasive is at least 6. Practical examples of the commercially available abrasives include AKP-10, AKP-15, AKP-20, AKP-30, AKP-50, AKP-1520, AKP-1500, HIT-50, HIT 60A, HIT 60G, HIT 70, HIT 80, HIT 82, and HIT-100 (manufactured by Sumitomo Chemical Co., Ltd.); G5, G7, S-1, and Chromium Oxide K (manufactured by Nippon Chemical Industrial Co., Ltd.); UB 40B (manufactured byC. Uyemura Kogyo & Co., Ltd.); WA8000 and WA10000 (manufactured by Fujimi Kenmazai K.K.); LS600F 0/-1/4 (manufactured by Lands Corporation); MD-200, MD-150, MD-70, IRM 0-1/4F, and 0-1/4FF (manufactured by Tomei Diamond. Co., Ltd.); 0-1/10 and 0-1/4 (manufactured by General Electric Company); Mypolex 1/10QG and Mypolex 1/8QG (manufactured by E. I. Du Pont de Nemours & Company); TF100, TF140, and TF180 (manufactured by Toda Kogyo Corp.).

The abrasives having an average particle size of from 0.05 to 1 μm are effectively used and the average particle size is preferably from 0.05 to 0.5 μm.

The abrasives can be used singly but it is suitable to use two or more kinds of the abrasives together, and in the case of fine particles of diamond, by using together with other abrasives, the addition amount thereof to the magnetic powder can be reduced to about 0.1%. The sum total of these abrasives added is from 1 to 20 parts by weight, and preferably from 1 to 15 parts by weight to 100 parts by weight of the magnetic powder. When the addition amount is less than 1 part by weight, a sufficient durability is not obtained, and when the addition amount exceeds 20 parts by weight, the surface property and the packing degree are deteriorated. These abrasives may be previously subjected to a dispersion treatment with a binder before adding to the magnetic coating composition.

The magnetic layer of the magnetic recording medium of the invention can contain electroconductive particles as an antistatic agent in addition to the above-described non-magnetic particles. However, in this case, for increasing the saturated magnetic flux density of the uppermost layer in maximum, it is preferred that the addition amount to the uppermost layer is reduced as small as possible and the electroconductive particles are added other coated layer than the uppermost layer. As the antistatic agent, carbon black is particularly preferred in the point of lowering the surface electric resistance of the whole medium. The carbon black, which can be used in the invention, includes, e.g., furnace black for rubber, thermal black for rubber, carbon black for coloring, electroconductive carbon black and acetylene black. It is preferred that the specific surface area is from 5 to 500 $m^2$/g, the DBP oil absorption is from 10 to 1500 ml/100 g, the particle sizes are from 5 to 300 nm, the pH is from 2 to 10, the moisture content is from 0.1 to 10%, and the tap density is from 0.1 to 1 g/$cm^3$.

Practical examples of the commercially available carbon black, which can be used in the invention, include blackpearls 2000, 1300, 1000, 900, 800, and 700, Vulcan XC-72 (manufactured by Cabot Corporation); #80, #60, #55, #50 and #35 (manufactured by Asahi Carbon Co., Ltd); #3030B, #3040B, #3050B, #3230B, #3350B, #9180B, #2700, #2650, #2600, #2400, #2300, #950B, #900, #1000, #95, #30, #40, #10B. MA230, MA220 and MA77 (manufactured by Mitsubishi Chemical Corporation); Conductex SC, Raven 150, 50, 40, and 15 (manufactured by Columbian Chemical Company); Ketjen Black EC, Ketjen Black ECDJ-500, and Ketjen Black ECDJ-600 (manufactured by Lion Akzo Co., Ltd).

The carbon black may be subjected to a surface treatment with a dispersing agent, etc., to an oxidation treatment, or may be grafted with a resin before use, or the carbon black, a part of the surface of which is graphitized, may be used. Also, before adding the carbon black to the magnetic coating composition, the carbon black may be previously dispersed in a binder. When carbon black is used in the magnetic layer, the amount thereof to the magnetic powder is preferably from 0.1 to 30% by weight. Furthermore, in the case of adding carbon black to the non-magnetic layer described below, it is preferred that the content of the carbon black is from 3 to 20% by weight to the total non-magnetic powders.

In general, carbon black has functions as not only antistatic agent but also for reducing the friction coefficient, for imparting light-shielding property, and for improving the film strength, and the functions are different according to the carbon black used. Accordingly, the carbon blacks used in the invention can be, as a matter of course, selectively used according to the purposes based on the above-described characteristics such as the particle sizes, the oil absorption, the electric conductivity, the pH, etc., by changing the kinds, the amounts, and the combination. The carbon black which can be used in the invention can be referred, for example, to "Carbon Black Handbook" edited by the Carbon Black Society.

There is no particular restriction on the layer structure of the magnetic recording medium having the magnetic layer containing the ferromagnetic metal powder of the invention and known layer structure can be employed but it is preferred to form a non-magnetic layer between the support and the magnetic layer. The non-magnetic layer (sometimes, referred to as under layer (lower layer)) is preferably a layer wherein a non-magnetic powder is dispersed in a binder resin. As the non-magnetic powder used for the non-magnetic layer, various kinds of powders can be used. For example, aluminium oxide having an α-alumina content of at least 90%, b-alumina, γ-alumina, silicon carbide, chromium oxide, cerium oxide, α-iron oxide, goethite, corundum, silicon nitride, titanium carbide, titanium oxide, silicon dioxide, boron nitride, zinc oxide, calcium carbonate, calcium sulfate and barium sulfate are used singly or as a combination thereof. As the non-magnetic powder having fine and uniform particle sizes, γ-iron oxide, goethite, titanium oxide, and zinc oxide are suitable. The particle sizes of these non-magnetic powders are preferably from 0.01 to 1 μm. But, if desired, non-magnetic powders each having different particle size are combined to use for broadening particle size distribution or a single non-magnetic powder having a broad particle size distribution is used for obtaining the same effect. For improving the dispersibility by increasing the interaction with a binder resin used, the non-magnetic powder used may be subjected to a surface treatment. The powders existing on the surfaces of the particles of the non-magnetic powder by the surface treatment may be an inorganic substance such as silica, alumina, silica-alumina, etc., or powders formed by a coupling agent. It is preferred that the tap density of the non-magnetic powder is from 0.3 to 2 g/cm², the moisture content is from 0.1 to 5% by weight, the pH is from 2 to 11, and the specific surface area is from 5 to 100 m²/g. The form of the non-magnetic powder may be an acicular form. a spherical form, a cubic form, or a tabular form.

Practical examples of the commercially available non-magnetic powder include Nanotite (manufactured by Showa Denko K. K.); HIT-100 and HIT-80 (manufactured by Sumitomo Chemical Co., Ltd.);α-iron oxide: DPN-250BX, DPN-245, DPN-270BX, DPN-550BX, DPN-550RX, DBN-450BX, DBN-650RX, and DAN-850RX (manufactured by Toda Kogyo Corp.); titanium oxide: TTO-51B, TTO-55A, TTO-55B, TTO-55C, TTO-55S, TTO-55D, and SN-100 (manufactured by Ishihara Sangyo Co, Ltd.); titanium oxide: STT-4D, STT-30D, STT-30, and STT-65C (manufactured by Titan Kogyo K. K.; titanium oxide: MT-100S, MT-100T. MT-150W, MT-500B, MT-600B, MT-100F, and MT-500HD (manufactured by Tayca Corporation); FINEX-25, BF-1, BF-10, BF-20, and ST-M (manufactured by Sakai Chemical Industry Co., Ltd.); iron oxide: DEFIC-Y and DEFIC-R (manufactured by Dowa Mining Co., Ltd.); AS2BM and TiO2 P25 (manufactured by Nippon Aerosil Co., Ltd.); 100A and 500A and the burned products thereof (manufactured by Ube Industries, Ltd.).

It is effective for producing the magnetic recording medium of a high-recording density to form plural coated layers on a support as described above, and a simultaneous coating system is particularly excellent since a super thin magnetic layer can be formed by the system. The practical examples of the simultaneous coating system, that is the wet-on-wet system are as follows.

(1) A method wherein an under layer is coated using a gravure coating method, a roll coating method, a blade coating method or an extrusion coating method, which is ordinarily used for magnetic coating composition and while the under layer is yet in a wet state, an upper layer is coated by a support-press-type extrusion coating apparatus as disclosed, for example, in JP-B-1-46186, JP-A-60-238179 and JP-A-2-265672.

(2) A method of almost simultaneously coating the upper layer and the under layer by a coating head having two slits for passing the coating solutions as disclosed in JP-A-63-88080, JP-A-2-17971 and JP-A-2-265672.

(3) A method of almost simultaneously coating the upper layer and the lower layer by an extrusion coating apparatus equipped with a back-up roll as disclosed in JP-A-2-174965.

In the case of coating a wet-on-wet system, when the fluid characteristics of the coating solution for the magnetic layer are similar to the fluid characteristics of the coating solution for the non-magnetic layer as close as possible, the disturbance of the interface between the magnetic layer and the non-magnetic layer coated does not occur and uniform magnetic layer having less thickness fluctuation can be obtained. Because the fluid characteristics of a coating solution strongly depend on the combination of the powder particles and the binder resin in the coating solution, it is particularly necessary to care the selection of the non-magnetic powder used for the non-magnetic layer.

The thickness of the support of the magnetic recording medium of the invention is usually from 3 to 100 μm, when the magnetic recording medium is used as a tape form, the thickness of the support is preferably from 3 to 20 μm. and when the medium is used as a flexible disk, the thickness of the support is preferably from 25 to 80 μm. The thickness of the non-magnetic layer formed on the support is usually from 0.5 to 5.0 μm, and preferably from 0.5 to 3 μm. The thickness of the magnetic layer on the non-magnetic layer is preferably from 0.01 to 0.3 μm, and more preferably from 0.1 to 0.2 μm. Also, other layer than the above-described magnetic layer and the non-magnetic layer can be formed according to the purposes. For example, for improving the adhesion between the support and the lower layer, an under-coat layer may be formed on the support. The thickness of the under-coat layer is usually from 0.01 to 1 μm, and preferably from 0.05 to 0.3 μm. Also, a back layer may be formed onto the opposite surface of the support to the surface of carrying the magnetic layer. The thickness of the back layer is usually from 0.1 to 1.0 μm, and preferably from 0.3 to 1.0 μm. For the under-coat layer and the back layer, known materials can be used. In the case of disk-form magnetic recording medium, the layer construction including the above-described magnetic layer may be formed on both surfaces or on one surface of the support.

There is no particular restriction on the support used in the invention and the supports, which are usually used in the field, can be used. Examples of the material forming the support include various synthetic resins such as polyethylene terephthalate, polyethylene, polypropylene, polycarbonate, polyethylene naphthalate, polyamide, polyamideimide, polyimide, polysulfone and polyether sulfone, and metal foils such as an aluminum foil and a stainless steel foil.

For effectively attaining the objects of the invention, the surface roughness of the support is, as the centerline average surface roughness Ra (cut off value 0.2 mm), not larger than 0.03 μm, preferably not larger than 0.02 μm, and more preferably not larger than 0.01 μm. Also, it is preferred that in the support, not only the centerline average surface roughness is small but also there are no rough projections of at least 1 μm. The roughness form of the surface of the support is desirably controlled by the size and the amount of a filler, which is added to the support according to the necessary. Examples of the filler include the oxides and carbonates of Ca, Al, Si, Ti, etc., and organic resin fine powders such as the fine powders of acrylic resins. The F-5 value of the web running direction of the support used in the invention is preferably from 5 to 50 kg/mm² (49 to 490 MPa), the F-5 value of the web width direction is preferably from 3 to 30 kg/mm² (29.4 to 294 MPa), and it is general that the F-5 value of the lengthwise direction of web is higher than the F-5 value of the web width direction. However, when it is particularly necessary to increase the strength of the width direction, the above-description is not applied.

Also, the heat shrinkage degrees of the web running direction and width direction of the support at 100° C. for 30 minutes are preferably not higher than 3% and more preferably not higher than 1.5%, and the heat shrinkage degrees at 80° C. for 30 minutes are preferably not higher than 1%, and more preferably not higher than 0.5%, respectively. It is desirable that the breaking strength is from 5 to 100 kg/mm² (49 to 980 MPa) in both directions, and the elastic modulus is from 100 to 2000 kg/mm² (980 to 19600 MPa)

The organic solvent, which is used invention, includes ketones such as acetone, methyl ethyl ketone, methyl isobutyl ketone, diisobutyl ketone, cyclohexanone, isophorone, tetrahydrofuran, etc.; alcohols such as methanol, ethanol, propanol, butanol, isobutyl alcohol, isopropyl alcohol, methylcyclohexanol, etc.; esters such as methyl acetate, butyl acetate, isobutyl acetate, isopropyl acetate, ethyl lactate, glycol acetate, etc.; glycol ethers such as glycol dimethyl ether, glycol monoethyl ether, dioxane, etc.; aromatic hydrocarbons such as benzene, toluene, xylene, cresol, chlorobenzene, etc.; chlorinated hydrocarbons such as methylene chloride, ethylene chloride, carbon tetrachloride, chloroform, ethylene chlorohydrin, dichlorobenzene, etc.; N,N-dimethylformamide; hexane, etc. They can be used at an appropriate ratio.

These organic solvents are not always 100% pure and may contain impurities such as isomers, unreacted materials, by-products, decomposed matters, oxides, water, etc., in addition of the main constituents. The content of the impurity is preferably not more than 30%, and more preferably not more than 10%. If desired, the kind and the amount of the organic solvent used in the invention may be changed in each layer. For example, the surface property of the lower layer is improved by using the solvent having a high volatility, the stability of coating for the lower layer is increased by using the solvent having a high surface tension (e.g., cyclohexanone or dioxane) for the layer, the packing degree of the magnetic layer is increased by using the solvent having a high solubility parameter for the magnetic layer. However, the invention is, as a matter of course, not limited to these examples.

The magnetic recording medium of the invention is obtained by kneading and dispersing the above-described ferromagnetic metal powder, binder resin, and, if desired other additives, using the organic solvent, coating the magnetic coating material on a support, if desired, orienting, and drying.

The process of producing the magnetic coating composition for the magnetic recording medium of this invention comprises a kneading step, a dispersing step, and mixing steps employed, if desired, before and after these steps. Each step may be separated to two or more stages. All the raw materials such as the magnetic powder, the binder, carbon black, an abrasive, an antistatic agent, a lubricant, a solvent, etc., which are used in the invention, may be added at the beginning of any step or in the middle of the step. Also, each raw material may be added separately in two or more steps. For example, polyurethane may be separately added in the kneading step, the dispersing step, and a mixing step for controlling the viscosity after dispersing.

At kneading and dispersing the magnetic coating composition, various kinds of kneading machines are used. For example, a two-roll mill, a three-roll mill, a ball mill, a pebble mill, a tolon mill, a sand grinder, Szegvari, an attriter, a high-speed impeller dispersing machine, a high-speed stone mill, a high-speed impact mill, a disper, a kneader, a high-speed mixer, a homogenizer, a ultrasonic dispersing machine, etc., can be used.

In the kneading step, it is preferred to use a kneader having a strong kneading force, such as a continuous kneader, a press kneader, etc., for obtaining the magnetic recording medium having a higher residual magnetic flux density. In the case of using a continuous kneader or a press kneader, the magnetic powder and all the binder or a part of the binder (however, at least 30% of the binder is preferred) are kneaded or the binder of from 15 to 500 parts by weight to 100 parts by weight of the magnetic powder are kneaded. The details of the kneading treatment are described in JP-A-1-106338 and JP-A-64-79274. In the invention, by using the simultaneous multilayer coating system as described in JP-A-62-212933, the magnetic recording medium can be efficiently produced.

The residual solvent contained in the magnetic layer of the magnetic recording medium of the invention is preferably not more than 100 mg/m$^2$, and more preferably not more than 10 mg/m$^2$, and it is preferred that the residual solvent contained in the magnetic layer is less than the residual solvent contained in the non-magnetic layer.

The voids of the magnetic layer are preferably not more than 30% by volume, and more preferably not more than 10% by volume in both the lower layer and the uppermost layer. It is preferred that the voids of the non-magnetic layer are larger than the voids of the magnetic layer but when the voids of the non-magnetic layer are at least 5% by volume, the voids of the non-magnetic layer may be smaller than the voids of the magnetic layer.

When the magnetic recording medium of the invention has the lower layer and the magnetic layer, it can be easily considered that the physical properties of the lower layer can be changed from the physical properties of the magnetic layer according to the purposes. For example, the elastic modulus of the magnetic layer is increased to improve the running durability and at the same time, the elastic modulus of the lower layer is lowered than that of the magnetic layer, whereby the touching property of the magnetic recording medium to a magnetic head is improved.

The magnetic layer, etc., coated on the support by the method described above is, if desired, subjected to the treatment of orienting the ferromagnetic powder in the magnetic layer and thereafter, the magnetic layer is dried. Also, if desired, a surface smoothing treatment is applied to the magnetic recording medium, and the medium is cut into a desired form to produce the magnetic recording medium of the invention.

The elastic modulus of the magnetic layer at the 5% elongation is desirably from 100 to 2000 kg/mm$^2$ (980 to 19600 MPa) in both the web coating direction and the width direction, the breaking strength is desirably from 1 to 30 kg/cm$^2$ (98 to 2940 kPa), the elastic modulus of the magnetic recording medium is desirably from 100 to 1500 kg/mm$^2$ (980 to 14700 MPa) in both the web coating direction and the width direction, the residual elongation is desirably not larger than 0.5%, the heat shrinkage factor at all the temperature of 100° C. or lower is desirably not higher than 1%, more desirably not higher than 0.5%, and most desirably not higher than 0.1%.

The magnetic recording medium of the invention may be a magnetic recording tape for video, audio, etc., or a floppy disk or a magnetic disk for data recording, but is particularly effective as a medium for digital recording wherein lacking of signals by the generation of drop out becomes a fatal fault. Furthermore, by employing a double layer construction of a non-magnetic layer and a magnetic layer and reducing the thickness of the magnetic layer to 0.5 μm or thinner, a magnetic recording medium which has the high electromagnetic characteristics, is excellent in the overwrite characteristics, and has a high density and a large capacity can be obtained.

Now, the novel features of the invention are practically explained by the following examples.

EXAMPLES 1 to 5

Production of Ferromagnetic Metal Powder

In a 150 liter tank equipped with a stirrer, a mixed solution of 35 liters of an aqueous solution of 1.7 mols/liter of ammonium carbonate and 15 liters of aqueous ammonia of 2.0 mols/liter was bubbled with nitrogen at a liquid temperature of 20° C., and 40 liters of an aqueous solution containing ferrous sulfate, cobalt sulfate, and aluminum sulfate (Fe$^{2+}$ concentration was 1.35 mols/liter, Co concentration of 0.15 mols/liter, and Al concentration of 0.04 mols/liter) having a liquid temperature of 20° C. prepared while bubbling with nitrogen in a separate tank was added to the above-described mixed solution followed by mixing.

After mixing for 10 minutes, temperature of the suspension was raised to 25° C. to form precipitates containing ferrous hydroxide as the main constituent. The system was bubbled with nitrogen to ripen the precipitates for 60 minutes. Then, in place of nitrogen, air was introduced therein to oxidize the precipitates to form goethite nuclei. When the concentration of $Fe^{2+}$ in the suspension became 0.75 mols/liter, the air oxidation was stopped, air was changed to nitrogen, the temperature of the suspension was raised to 40° C., and after maintaining for 2 hours, nitrogen was changed to air to proceed the oxidation reaction, whereby spindle-form goethite particles containing the solid solution of Al and Co were formed. The particles obtained were collected by filtration and washed with water. When a part of the particles were dried, photographed by a transmission-type electron microscope, and the particle sizes were determined, the average major axis length was 110 nm and average acicular ratio of 7. Also, after dehydrating by heating in nitrogen at 120° C. for 30 minutes, the specific surface area of this geothite was 130 $m^2/g$.

While stirring the goethite particles obtained in water as 2% slurry, an aqueous solution of cobalt sulfate and an aqueous solution of magnesium chloride (the molar amounts of the compounds added are shown in the column of addition elements of Table 1 below in terms of parts taking the total molar amount of iron and Co in the goethite as 100 parts) were added, and the mixture was neutralized with aqueous ammonia to deposit the cobalt compound and the magnesium compound on the surfaces of the particles. After filtering the slurry to collect the particles and washing the particles with water, 2% aqueous slurry of the particles was formed again, and an aqueous solution of aluminum sulfate and an aqueous solution of ferric sulfate were added thereto (the molar amounts of the compounds added are shown in the column of sintering inhibitor of Table 1 below in terms of parts taking the total molar amounts of iron and Co in the goethite as 100 parts). After stirring the mixture slurry for 20 minutes, the slurry was neutralized by adding diluted aqueous ammonia. After filtering the slurry to collect the particles and washing the particles with water, a 2% slurry of the particles was formed, an aqueous solution of yttrium nitrate was added (the molar amount of the compound added is shown in the column of sintering inhibitor of Table 1 below in terms of parts taking the total molar amounts of iron and Co in the goethite as 100 parts), and the pH thereof was adjusted to 8.5 with aqueous ammonia. The mixture was filtered to collect the particles, the particles were washed with water, a 5% aqueous slurry of the particles was formed and heated to 150° C. for one hour. Thereafter, the slurry was filtered and washed with water, a cake obtained was passed through a molding machine followed by drying to obtain spindle-form goethite subjected to the sintering inhibiting treatment was obtained.

The spindle-form goethite obtained was placed in a stationary-type furnace, heated to 350° C. for 30 minute in nitrogen to carry out a dehydration treatment and then heated to a temperature of 650° C. for 2 hours to enhance crystallization of hematite. The temperature was lowered to 400° C., the gas was changed from nitrogen to a mixed gas of hydrogen:nitrogen=20:80, and the particles were reduced for 0.5 hour. After replacing the mixed gas with nitrogen, the gas was changed to pure hydrogen, and the particles were reduced for 5 hours. The particles were cooled while flowing hydrogen, and the pure hydrogen gas was changed to nitrogen gas at 300° C., followed by cooling the particles to room temperature. The particles were transferred to a slow-oxidizing apparatus, the mixing ratio of air and nitrogen was adjusted to the oxygen concentration of 0.2%, the dew point of the gas was adjusted to −45° C., while monitoring the temperature of the metal powder formed, the metal powder was slow-oxidized at a temperature of not higher than 40° C. for 2 hours. After the ending of the heat generation, the oxygen concentration was increased to 1% and the metal powder was slow-oxidized for 10 hours, while the temperature of the slow-oxidizing apparatus was kept at 40° C., and the metal powder was slow-oxidized such that the temperature of the ferromagnetic metal powder did not exceed 40° C. Thereafter, while vaporizing distilled water, steam was sent to the metal powder together with air such that the moisture content of the metal powder became 1%, whereby the metal powder was humidified and also stabilized.

EXAMPLE 6

The slow-oxidation conditions of the metal powder obtained by dehydrating and reduction treating as in Example 3 were changed as follows. The metal powder was transferred into a slow-oxidizing apparatus, the mixing ratio of air and nitrogen was adjusted to the oxygen concentration of 0.2% and the dew point of the gas was adjusted to −45° C., while monitoring the temperature of the metal powder, the metal powder was slow-oxidized at a temperature of not higher than 40° C. for 2 hours. After the ending of the heat generation, the oxygen concentration was increased to 1% and slow-oxidized for 10 hours, while the temperature of the slow-oxidizing apparatus was kept at 50° C., the metal powder was slow-oxidized such that the temperature of the ferromagnetic metal powder did not exceed 50° C. Thereafter, while vaporizing distilled water, steam was sent to the metal powder together with air such that the moisture content of the metal powder became 1%, whereby the metal powder was humidified and also stabilized.

EXAMPLE 7

Preparation of Hematite Nuclei

Into a closable 2-liter glass container were added 500 ml of an aqueous solution of 2 mols/liter of $FeCl_3$ and 500 ml of an aqueous solution of 5.94 mols/liter of NaOH with stirring over a period of 5 minutes, after finishing the addition, the mixture was further stirred for 20 minutes, and the container was completely closed.

The container was placed in an oven previously heated at 100° C. and kept therein for 72 hours. After 72 hours, the container was quickly cooled with running water, the reaction liquid was collected, separated by a centrifugal separator at 15000 rpm. for 15 minutes, and the supernatant liquid formed was removed. Distilled water was added to the residue to disperse again the residue, the dispersion was subjected to the centrifugal separation again, and the supernatant liquid formed was removed. Using the centrifugal separator, water washing was repeated three times in the same manner as above.

The precipitates of the hematite particles (average particle size: about 80 nm) after the water washing were dried.

To 50 g of the dried powder thus-obtained was added 5 ml of distilled water and the powder was ground by a mortar for 30 minutes. The powder was washed out in a beaker using 500 ml of distilled water, 100 ml each of the content was placed in a 200 ml mayonnaise bottle containing steel beads and dispersed for 10 hours. The dispersions were gathered, the mayonnaise bottles were washed with distilled water and the dispersions were recovered. Distilled water was added to the recovered dispersion to make the total liquid amount 1200 ml and further they were dispersed by ultrasonic waves for 30 minutes. The dispersion was collected and subjected to a centrifugal separation at 10,000 rpm for 30 minutes, and then the supernatant liquid having dispersed therein the super fine particles of hematite (average particle size: about 70 angstroms) was collected to obtained a nuclei liquid. The iron concentration in the nuclei liquid was 2000 ppm.

Crystallite size control of monodispersed spindle-type hematite:

In a reaction vessel equipped with a stirrer was placed 180 ml of an aqueous solution of 1 mol/liter of ferric nitrate and the solution was cooled to 5° C. Then, 180 ml of an aqueous solution of 2.4 mols/liter of sodium hydroxide was added to the solution with stirring over a period of 5 minutes. Thereafter, stirring was continued for further 5 minutes, and 180 ml of the nuclei liquid was added thereto followed by stirring for 10 minutes. The liquid obtained was collected 60 ml each, 10 ml of an aqueous solution of 0.048 mol/liter of $NaH_2PO_4$ as a form-controlling ion was added thereto, and after adding 10 ml of water, the vessel was closed. The closed vessel was maintained in an oven previously heated at 120° C. for 72 hours. The vessel was quickly cooled with running water, the reaction liquid was subjected to a centrifugal separation by a centrifugal separator at 18,000 rpm for 15 minutes, and the supernatant liquid formed was removed. The residue was dispersed again in distilled water and the dispersion was subjected to a centrifugal separation again, and the supernatant liquid formed was removed. Using the centrifugal separator, water washing was repeated three times in the same manner as above. Then, the residual particles were dispersed again in aqueous ammonia of 1 mol/liter, the dispersion was subjected to a centrifugal separation, and the supernatant liquid formed was removed. The residual particles were dispersed in distilled water again, the dispersion was subjected to a centrifugal separation, and the supernatant liquid formed was removed. Using the centrifugal separator, water washing was repeated three times in the same manner as above. A part of the product was sampled and the dried particles obtained were observed by a transmission-type electron microscope. The $\alpha$-$Fe_2O_3$ having an excellent particle distribution wherein the average major axis length was 70 nm, and average acicular ratio was 5.0, and the variation coefficient of the major axis lengths (the standard deviation of the major axis lengths/the average major axis length) was 7% was obtained.

The monodispersed spindle-form hematite obtained was dispersed in distilled water such that the hematite concentration became 2%, cobalt sulfate was added to the dispersion such that the amount of Co became 10 atom % (described in the column of addition element of Table 1) taking Fe in the hematite as 100 atom %, and the mixture was sufficiently mixed by stirring.

While stirring the suspension and monitoring the pH thereof, aqueous ammonia was added to the suspension to make the pH 8.5, whereby the Co compound was deposited on the surfaces of the hematite particles. The suspension was filtered to collect the hematite particles, the particles were washed with water. The particles were dispersed in distilled water such that the hematite concentration became 2%, while stirring the dispersion, an aqueous solution of aluminum sulfate and an aqueous solution of ferric sulfate were added to the dispersion (the amount of Al was 8.0 atom % and the amount of $Fe^{3+}$ was 4.0 atom % shown in the column of sintering inhibitor of Table 1 taking the amount of Fe in the hematite as 100 atom %), and the pH of the dispersion was adjusted to 8.5 by adding diluted aqueous ammonia. Then, an aqueous solution of yttrium nitrate was added to the suspension with stirring such that the amount of Y became 6 atom % as described in the column of sintering inhibitor of Table 1 taking the amount of Fe in the hematite as 100 atom %, and the pH was adjusted to 8.5 by adding aqueous ammonia. The suspension was filtered and the particles collected were washed with distilled water to remove impurities. The surface-treated spindle-form hematite particles obtained were passed through a molding plate having a diameter of 3 mm to mold to a column form followed by drying.

The surface-treated monodispersed spindle-form hematite particles were placed in a stationary type reducing furnace, heated at 350° C. for 30 minutes in nitrogen gas, and then subjected to an annealing treatment at 650° C. for 2 hours. Then, the temperature was lowered to 350° C., the gas was changed from the nitrogen gas to a gas mixture of hydrogen:nitrogen=20:80 and the particles were reduced for one hour. After changing the mixed gas to nitrogen gas, the temperature was raised to 475° C., the nitrogen gas was changed to pure hydrogen gas, and the particles were reduced for 5 hours. The particles were cooled in the hydrogen gas and when the temperature became 300° C., the hydrogen gas was changed to nitrogen gas, followed by cooling the particles to room temperature. The particles were transferred into a slow-oxidizing apparatus, the mixing ratio of air and nitrogen gas was changed such that the oxygen concentration became 0.2%, and while monitoring the temperature of the metal powder such that the temperature did not exceed 40° C., the metal powder was slow-oxidized. Then, the temperature of the slow-oxidizing apparatus was kept at 40° C., and oxygen concentration was increased to 1%, and the metal powder was slow-oxidized for 10 hours. Thereafter, while vaporizing distilled water, steam was sent to the metal powder together with air such that the moisture content of the metal powder became 1%, whereby the metal powder was humidified and also stabilized.

EXAMPLE 8

By using neodymium nitrate (the amount of Nd was 5 atom % taking the amount of Fe in hematite as 100 atom %) in place of the yttrium nitrate used in Example 7, a ferromagnetic metal powder was prepared under the same conditions as in

EXAMPLE 7.

Comparative Examples 1 to 3

Each of the spindle-form goethite particles after subjecting the sintering inhibiting treatment used in Examples 1 to 3 was placed in a stationary-type reducing furnace and subjected to a dehydration treatment in nitrogen gas at 350° C. for 60 minutes. The temperature was raised to 450° C., and the gas was changed from the nitrogen gas to pure hydrogen gas, followed by reducing the particles for 6 hours. Thereafter, the same treatments as in the examples were carried out.

The magnetic characteristics of the ferromagnetic metal powders obtained as described above were measured by a vibrating sample magnetometer (manufactured by Toei Industry Co., Ltd.) at a magnetic field of 10 kOe (796 kA/m). Each of the ferromagnetic metal powders obtained was photographed by a high-resolution transmission-type electron microscope, and from 500 particles, the average major axis length, the average acicular ratio, and the variation coefficient of the major axis lengths were obtained. Each of the metal powders was dehydrated in nitrogen gas at 250° C. for 30 minutes and the specific surface was measured by Quantasorb (manufactured by Quantachrome). About the water-soluble ions, 50 ml of distilled water was added to 5 g of each ferromagnetic metal powder followed by stirring at 25° C. for one hour, and using the extract obtained, the ion concentration of each of cations ($Na^+$, $NH_4^+$, $K^+$, $Mg^{2+}$, and $Ca^{2+}$) and anions ($F^-$, $Cl^-$, $NO_2^-$, $Br^-$, $NO_3^-$, $PO_4^{3-}$, and $SO_4^{2-}$) contained in the ferromagnetic metal powder was measured by an ion chromatography.

Also, each of the ferromagnetic metal powders obtained was subjected to an X-ray diffraction, and using a Rietveld method, the lattice constant of the spinel-type oxide and the existing ratio (mol ratio) of $MAl_2O_4$ or $MFe_2O_4$ to the sum of $MAl_2O_4$ and $MFe2O_4$ were calculated.

The results obtained are shown in Table 1.

TABLE 1

| No. | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Addition element | | | | | | | | | | | |
| Mg* | 0.5 | 0.5 | 0.5 | 0.5 | 0.5 | 0.5 | — | — | 0.5 | 0.5 | 0.5 |
| Co* | 10 | 20 | 20 | 20 | 20 | 20 | 10 | 10 | 10 | 20 | 20 |
| Sintering inhibitor | | | | | | | | | | | |
| Al* | 8.0 | 6.0 | 8.0 | 8.0 | 8.0 | 87.0 | 8.0 | 8.0 | 8.0 | 6.0 | 8.0 |
| $Fe^{3+}$** | 4.0 | 3.0 | 4.0 | 6.0 | 8.0 | 4.0 | 4.0 | 4.0 | 4.0 | 3.0 | 4.0 |
| Y* | 6.0 | 7.0 | 6.0 | 6.0 | 6.0 | 6.0 | 6.0 | — | 6.0 | 7.0 | 6.0 |
| Nd* | — | — | — | — | — | — | — | 5.0 | — | — | — |
| Hc KA/m | 183 | 185 | 186 | 184 | 184 | 198 | 171 | 170 | 181 | 182 | 182 |
| σs A·m²/g | 135 | 152 | 148 | 147 | 140 | 135 | 128 | 125 | 140 | 153 | 150 |
| Specific surface area m²/g | 48 | 47 | 50 | 52 | 50 | 51 | 62 | 59 | 43 | 45 | 44 |
| Average major axis length nm | 70 | 72 | 71 | 70 | 73 | 72 | 61 | 60 | 72 | 70 | 71 |
| Variation coefficient % | 22 | 21 | 20 | 20 | 21 | 20 | 7 | 9 | 25 | 26 | 25 |
| Average acicular ratio | 7 | 6.7 | 6.5 | 6.6 | 6.5 | 6.4 | 5.5 | 5.5 | 6.1 | 5.8 | 5.7 |
| Lattice constant of spinel-type oxide | 8.60 | 8.61 | 8.60 | 8.55 | 8.49 | 8.50 | 8.61 | 8.59 | 8.40 | 8.41 | 8.39 |
| Existing ratio of $MAl_2O_4$ Mol % | 90 | 95 | 95 | 80 | 60 | 70 | 90 | 85 | 0 | 0 | 0 |
| Existing ratio of $MFe_2O_4$ Mol % | 10 | 5 | 5 | 20 | 40 | 30 | 10 | 15 | 100 | 100 | 100 |
| Water-soluble cations | | | | | | | | | | | |
| Na+ ppm | 1 | 2 | 1 | 1 | 2 | 2 | 15 | 20 | 1 | 1 | 2 |
| $NH_4^+$ ppm | 2.3 | 3 | 2.1 | 2.5 | 2.8 | 1.8 | 2.5 | 2.3 | 2.5 | 2.7 | 3 |
| $K^+$ ppm | 0.5 | 0 | 0 | 0 | 0 | 0 | 0 | 0 | 0.5 | 0 | 0 |
| $Mg^{2+}$ ppm | 35 | 40 | 37 | 41 | 45 | 452 | 1 | 2 | 45 | 40 | 42 |
| $Ca^{2+}$ ppm | 0 | 1 | 0 | 0 | 1 | 0 | 2 | 3 | 1 | 1 | 1 |
| Total ppm | 38.8 | 46 | 40.1 | 44.5 | 50.8 | 45.8 | 20.5 | 27.3 | 50 | 44.7 | 48 |
| Water-soluble anions | | | | | | | | | | | |
| $F^-$ ppm | 0 | 0 | 0 | 0 | 0 | 0 | 0 | 0 | 0 | 0 | 0 |
| $Cl^-$ ppm | 2 | 3.3 | 3 | 2.5 | 1.5 | 2.5 | 10 | 9 | 2.5 | 2.5 | 3 |
| $NO_2^-$ ppm | 0.7 | 0.8 | 0.6 | 0.5 | 0.7 | 0.7 | 0.7 | 0.6 | 0.9 | 0.8 | 0.7 |
| $Br^-$ ppm | 0 | 0 | 0 | 0 | 0 | 0 | 0 | 0 | 0 | 0 | 0 |
| $NO_3^-$ ppm | 7.5 | 10 | 12 | 11 | 8 | 15 | 10 | 10 | 15 | 13 | 15 |
| $PO_4^{2-}$ ppm | 0 | 0 | 0 | 0 | 0 | 0 | 1 | 1 | 0 | 0 | 0 |
| $SO_4^{2-}$ ppm | 0.4 | 0.5 | 0.5 | 0.4 | 0.6 | 0.4 | 0.3 | 0.2 | 0.5 | 0.6 | 0.7 |
| Total ppm | 10.6 | 14.6 | 16.1 | 14.4 | 10.8 | 18.6 | 22 | 20.8 | 18.9 | 16.9 | 19.4 |

*The unit is described above in the specification.

Production of Magnetic Recording Medium

To prepare the magnetic tape of a double layer structure using each of the ferromagnetic metal powders obtained in Examples 3 to 8 and Comparative Example 3, the composition of the magnetic layer and composition of the non-magnetic layer shown below were prepared.

| Composition of magnetic layer: | |
|---|---|
| Ferromagnetic metal powder | 100 parts |
| Binder resin | |
| Vinyl chloride copolymer (containing $1 \times 10^{-4}$ eq/g of —SO$_3$K group, polymerization degree 300) | 13 parts |
| Polyester polyurethane resin (neopentyl glycol/caprolactone polyol/MD I = 0.9/2.6/1, containing $1 \times 10^{-4}$ eq/g of —SO$_3$Na group) | 5 parts |
| α-Alumina (average particle size: 0.13 μm) | 4 parts |
| Carbon black (average particle size: 50 nm) | 1 part |
| Phenylphosphonic acid | 3 parts |
| Butyl stearate | 3 parts |
| Stearic acid | 3 parts |
| 1:1 Mixed solvent of methyl ethyl ketone and cyclohexanone | 360 parts |
| Composition of non-magnetic layer: | |
| Acicular hematite (specific surface area by BET method: 55 m$^2$/g, average major axis length 0.10 μm, average acicular ratio: 7 pH: 8.8, 1 weight % Al$_2$O$_3$ exists on the surface) | 80 parts |
| Carbon black (average particle size: 17 nm, DBP oil absorption; 80 ml/100 g, specific surface area by BET method: 240 m$^2$/g, pH: 7.5) | 20 parts |
| Binder resin | |
| Vinyl chloride copolymer (containing $1 \times 10^{-4}$ eq/g of —SO$_3$K group, polymerization degree 300) | 12 parts |
| Polyester polyurethane resin (neopentyl glycol/caprolactone polyol/MD I = 0.9/2.6/1, containing $1 \times 10^{-4}$ eq/g of —SO$_3$Na group) | 5 parts |
| Phenylphosphonic acid | 3 parts |
| Butyl stearate | 3 parts |
| Stearic acid | 3 parts |
| 1:1 Mixed solvent of methyl ethyl ketone and cyclohexanone | 280 parts |

With each of the magnetic coating material and the non-magnetic coating material described above, the powder, the vinyl chloride copolymer, and phenylphosphonic acid were kneaded with each solvent of an amount of 50% by weight of the above-described formulation amount by a kneader, and thereafter, the polyurethane resin and residual components were added and they were dispersed by a sand grinder. To the dispersions thus-obtained, was added isocyanate in an amount of 15 parts to the coating liquid of the magnetic layer and in an amount of 14 parts to the coating liquid of the non-magnetic layer, and further 30 parts of cyclohexanone was added each coating liquid, and each coating liquid was filtered using a filter having an average pore diameter of 1 μm to prepare each of the coating liquid for forming the non-magnetic layer and the coating liquid for forming the magnetic layer.

The coating liquid for the non-magnetic layer as the lower layer was coated on a polyethylene terephthalate film support having a thickness of 7 μm at a dry thickness of 1.5 μm and immediately thereafter, while the coated layer of the lower non-magnetic layer was in a wet state, the coating liquid for the magnetic layer was coated thereon at a dry thickness of 0.15 μm, that is, by a wet simultaneous double coating system, and while both the coated layers are in wet states, the support was passed through a magnetic orientation apparatus to orient in the lengthwise direction. In the magnetic orientation treatment, the support having the coated layers in wet state is passed through a rare earth magnet (surface magnetic flux 500 mT) and thereafter passed through a solenoid magnetic (magnetic flux density 500 mT), and the coated layers are dried in the solenoid to the extent of not loosing the orientation, and then the coated layers are dried and wound. Thereafter, a 7-stage calender rolls composed of metal rolls were heated to 90° C. and the coated support was subjected to a calender treatment to obtain a web-form magnetic recording medium, which was slit to a 8 mm width to prepare each sample of a 8 mm video tape. With each sample obtained, the magnetic characteristics (Hi Hc component and SFDr from a remanence curve) were measured by a vibrating sample magnetometer, and also the thickness, the surface roughness, and the electromagnetic characteristics of the magnetic layer were measured.

The electromagnetic characteristics were measured by the following method. On a 8 mm deck for data recording were equipped an MIG head (head gap: 0.2 μm, truck width: 17 μm, saturated magnetic flux density: 1.5 T, and an azimuth angle: 20°) and a reproducing MR head (SAL bias, MR element was Fe—Ni, a truck width: 6 μm, a gap length 0.2 μm and azimuth angle: 20°). Using the MIG head, the relative speed of the tape and head was established to be 10.2 meters/second, from the input-output characteristics of 1/2 Tb (λ=0.5 μm), the optimum recording current was determined, and with the current, signals were recorded and were reproduced by the MR head. C/N was defined to be from the peak of the reproduced carrier to the erasure noise, and the resolution bandwidth of the spectrum analyzer was defined to be 100 kHz. The electromagnetic characteristics were shown using those of the tape used in Comparative Example 21 as control.

The overwrite characteristics were measured as follows. That is, from the input-output characteristics of 1/2Tb (λ=0.5 μm), the optimum recording current was obtained, using the current, a signal of 1/90Tb (λ=22.5 μm was recorded, and the overwrite characteristics were determined by the erasing ratio of 1/90Tb in the case of making overwrite at 1/2Tb.

The magnetic characteristics were measured using a vibrating sample magnetometer (manufactured by Toei Industry Co., Ltd.) by applying a magnetic field of 796 kA/m in parallel to the orientation direction.

Each magnetic recording medium was set to the vibrating sample magnetometer manufactured by Toei Industry Co., Ltd. such that the orientation direction of the measuring sample became same as the direction of the magnetic field, a magnetic field of −796 kA/m was applied to DC saturate, then the magnetic field was returned to zero, and the residual magnetization (−Mrmax) was measured. After applying a magnetic field of 7.96 kA/m to the contrary direction, the magnetic field was returned to zero, the residual magnetization Mr was measured, the applied magnetic field was changed by 7.96 kA/m each, the residual magnetization was repeatedly measured, and the remanence curve was determined. From the half width of the peak/the peak magnetic field, SFDr was obtained. SFD means switching-field distribution.

The high Hc component was calculated by the equation shown below using the residual magnetization Mr in the case of applying a magnetic field of 238.7 kA/m to the reverse direction and the residual magnetization Mrmax in the case of applying a magnetic field of 796 kA/m to the reversal direction at the determination of the remanence curve.

High Hc component (%)=100×(Mrmax−Mr)/[[Mrmax−(−Mrmax)]].

With the surface roughness, using a light coherent three-dimensional roughness meter "TOPO-3D" manufactured by WYKO Corporation of Arizona, U.S.A., the sample area of 250 μm square was measured. At the calculation of the measured value, the corrections of the inclination correction, the spherical correction, the cylinder correction, etc., were practiced according to JIS-B601, the center plane average surface roughness Ra was employed as the value of the surface roughness.

The entire disclosure of each and every foreign patent application from which the benefit of foreign priority has been claimed in the present application is incorporated herein by reference, as if fully set forth herein.

What is claimed is:

1. A ferromagnetic metal powder for magnetic recording, which comprises Fe and $MAl_2O_4$, in which M represents a transition metal, wherein the ferromagnetic metal powder has a coercive force (Hc) of from 135 to 240 kA/m, a saturation magnetization ($\sigma s$) of from 100 to 150 A·m²/kg, an average major axis length of from 30 to 80 nm, an average acicular ratio of from 4.0 to 8.0, and a variation coefficient of the major axis lengths of from 3 to 25%.

2. The ferromagnetic metal powder according to claim 1, which comprises Al in an amount of from 4 to 20 atom % based on 100 atom % of Fe.

3. The ferromagnetic metal powder according to claim 1, which further comprises Co in an amount of from 5 to 45 atom % based on 100 atom % of Fe.

4. The ferromagnetic metal powder according to claim 1, which further comprises $MFe_2O_4$, wherein a represents a transition metal, and the mol ratio: $MAl_2O_4/(MAl_2O_4+MFe_2O_4)$ is from 0.6 to 1.0.

5. The ferromagnetic metal powder according to claim 1, wherein the sum total of water-soluble anions and the sum total of the water-soluble cations existing in the whole of the

TABLE 2

| No. | Example 21 | Example 22 | Example 23 | Example 24 | Example 25 | Example 26 | Comparative Example 21 |
|---|---|---|---|---|---|---|---|
| Used ferromagnetic metal powder | Example 3 | Example 4 | Example 5 | Example 6 | Example 7 | Example 8 | Comparative Example 3 |
| Magnetic characteristics | | | | | | | |
| Hc KA/m | 198 | 197 | 195 | 210 | 187 | 186 | 191 |
| SQ | 0.895 | 0.892 | 0.891 | 0.901 | 0.875 | 0.867 | 0.872 |
| Saturated magnetic flux density × magnetic layer thickness mT · μm | 82.5 | 82.3 | 78.5 | 75.6 | 72.4 | 72.3 | 82.5 |
| SFDr | 0.214 | 0.223 | 0.221 | 0.245 | 0.188 | 0.191 | 0 |
| High HC component % | 24 | 24 | 25 | 33 | 17 | 18 | 30 |
| Magnetic layer thickness μm | 0.15 | 0.15 | 0.15 | 0.15 | 0.IS | 0.15 | 0.15 |
| Surface roughness Ra nm | 2.1 | 2.2 | 2.2 | 2.1 | 1.9 | 1.8 | 2.4 |
| Electromagnetic characteristics | | | | | | | |
| Output dB | 2.1 | 1.9 | 1.8 | 2.2 | 0.7 | 0.6 | 0 |
| C/N dB | 4.5 | 4.1 | 3.9 | 3.8 | 4.6 | 4.3 | 0 |
| Overwrite dB | −2.3 | −1.8 | −1.7 | −1.5 | −2.7 | −2.8 | 0 |

From the results shown in the above table, it can be seen that the magnetic recording media using the ferromagnetic metal powders of the invention have high output and show good C/N owing to a low noise. Also, the Hc distribution is small and the overwrite characteristics are good.

As described above, even when particles of the ferromagnetic metal powder are fine particle such as the average major axis length is from 30 to 80 nm and the coercive force thereof is from 135 to 240 kA/m, and also have a high Hc, the magnetic metal powder excellent in the coercive distribution can be prepared by forming $MAl_2O_4$ (M is a transition metal) as the surface oxide layer. Also, the magnetic recording medium using the ferromagnetic metal powder shows the remarkable reduction of noise, has a high output and high C/N, and also is excellent in the overwrite characteristics owing to the decrease of interaction between particles by the formation of $MAl_2O_4$.

ferromagnetic metal powder is from 0 to 50 ppm by weight and from 0 to 100 ppm by weight, respectively.

6. A magnetic recording medium comprising: a support; a non-magnetic layer comprising a non-magnetic powder and a binder; and at least one magnetic layer, in this order, wherein the magnetic layer comprises a ferromagnetic metal powder claimed in claim 1.

7. The magnetic recording medium according to claim 6, wherein the at least one magnetic layer has: a coercive force of from 135 to 240 kA/m; a magnetic layer thickness of from 0.01 to 0.3 μm; a product of a saturation magnetic flux density and the magnetic layer thickness of from 10 to 100 mT·μm; and a surface roughness of from 1.0 to 3.0 nm in terms of center plane average surface roughness by a 3D-MIRAU method.

* * * * *